June 27, 1933.   J. R. GAMMETER   1,915,660
DRIVING BELT AND METHOD FOR MAKING SAME
Filed Jan. 26, 1932   4 Sheets-Sheet 1
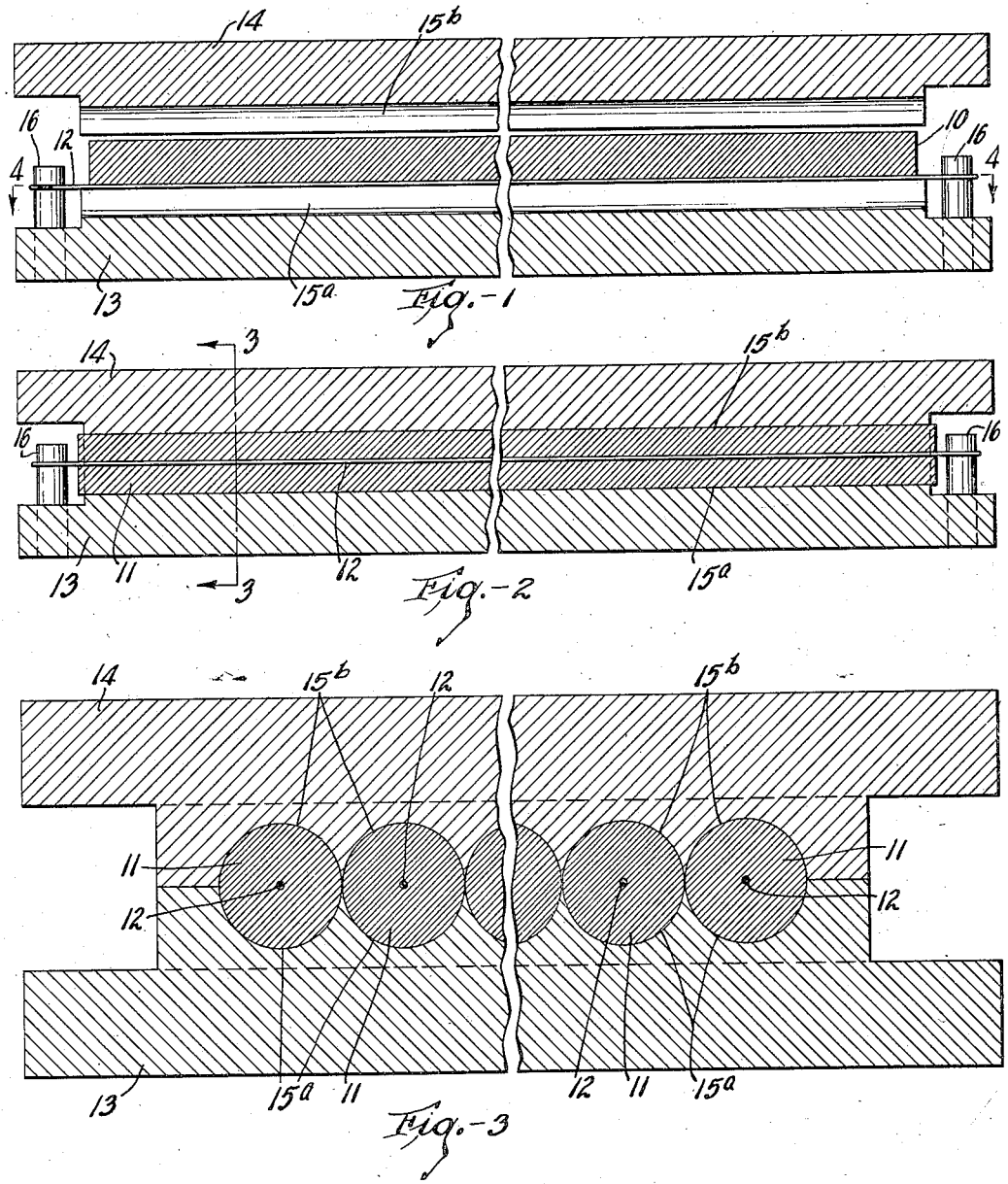
INVENTOR
JOHN R. GAMMETER
BY
Ely H Barrow
ATTORNEYS June 27, 1933. J. R. GAMMETER 1,915,660
DRIVING BELT AND METHOD FOR MAKING SAME
Filed Jan. 26, 1932 4 Sheets-Sheet 2
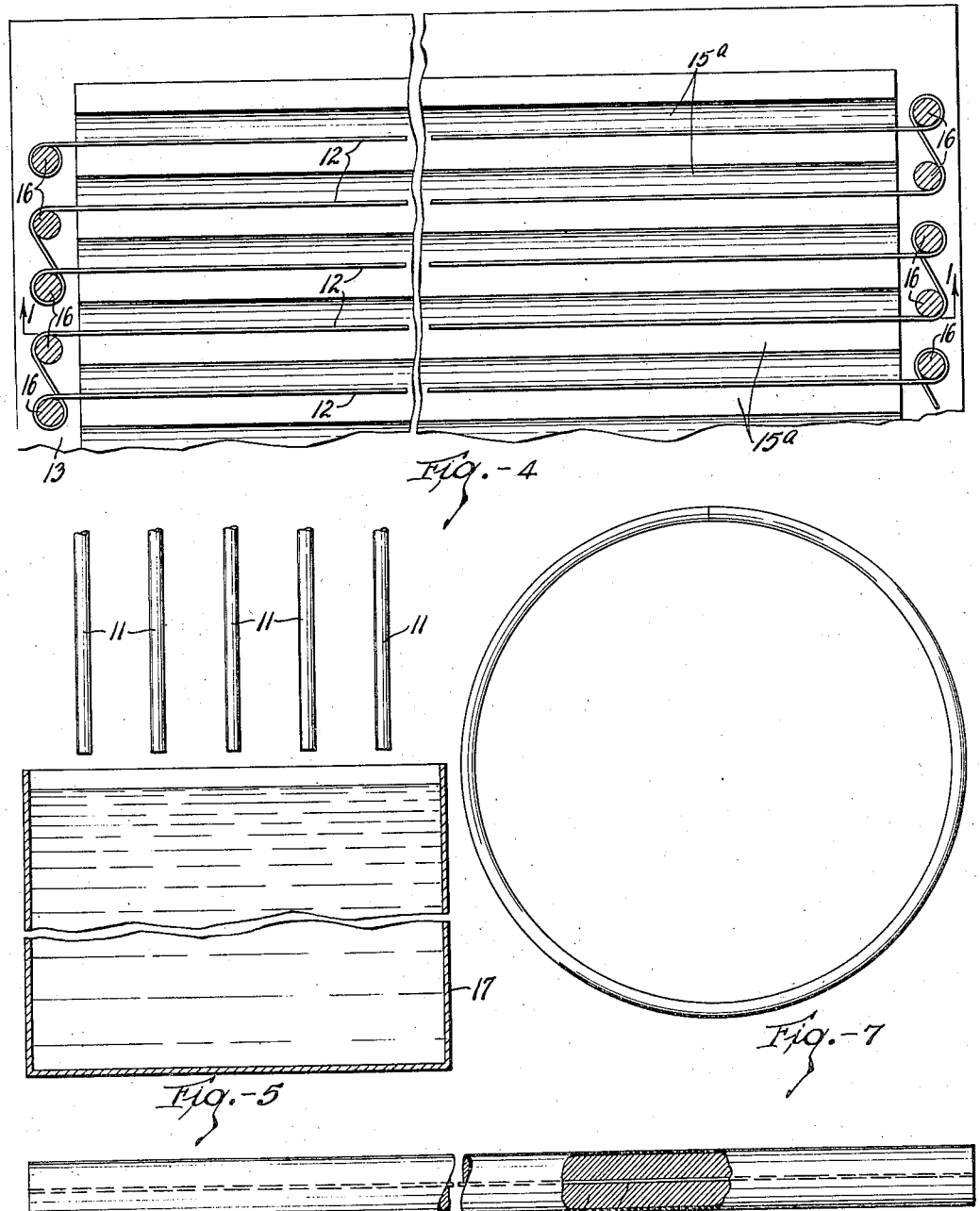
INVENTOR
JOHN R. GAMMETER
BY Ely & Barrow
ATTORNEYS June 27, 1933.  J. R. GAMMETER  1,915,660
DRIVING BELT AND METHOD FOR MAKING SAME
Filed Jan. 26, 1932  4 Sheets-Sheet 3
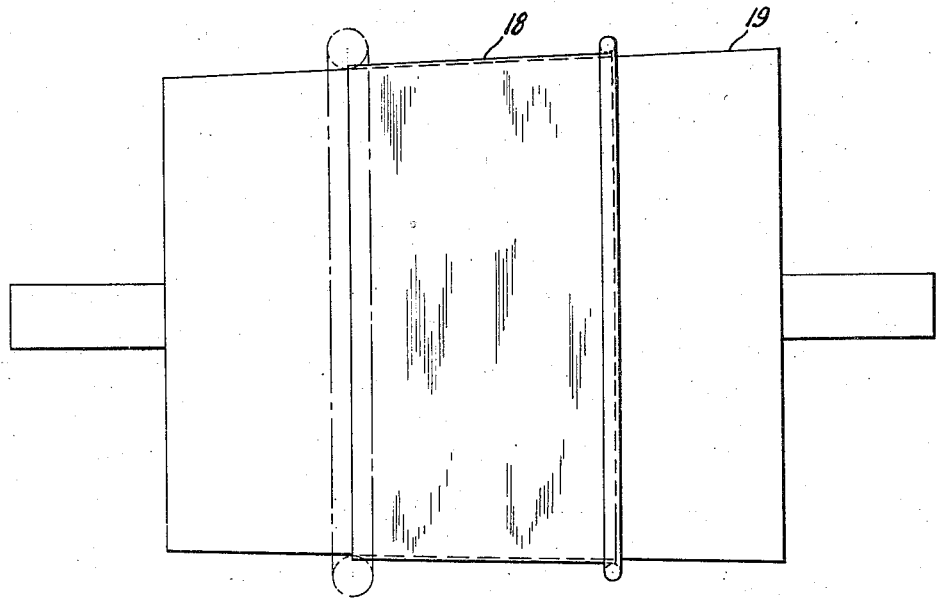
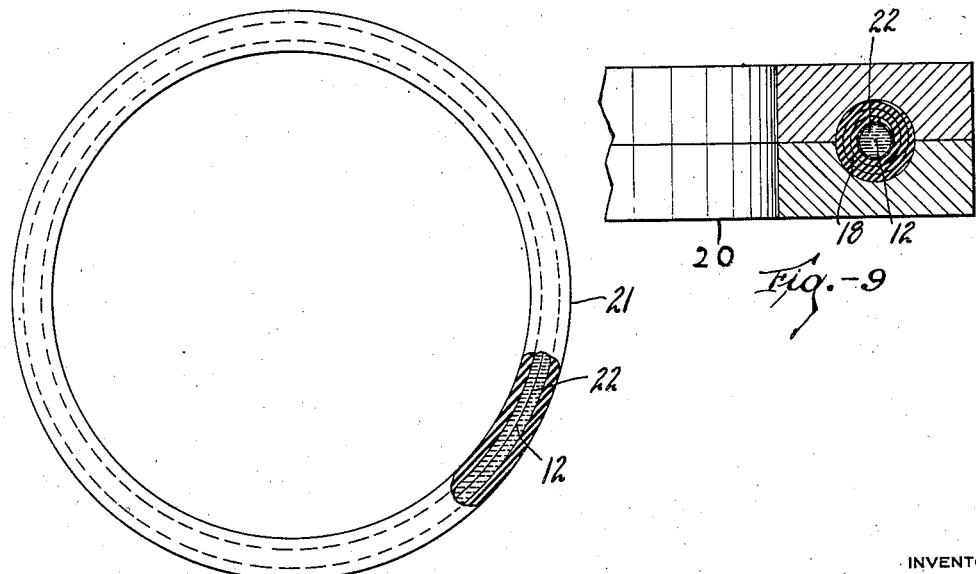
INVENTOR
JOHN R. GAMMETER
BY
ATTORNEYS June 27, 1933.   J. R. GAMMETER   1,915,660
DRIVING BELT AND METHOD FOR MAKING SAME
Filed Jan. 26, 1932   4 Sheets-Sheet 4

INVENTOR
JOHN R. GAMMETER
BY
ATTORNEYS

Patented June 27, 1933

1,915,660

UNITED STATES PATENT OFFICE

JOHN R. GAMMETER, OF AKRON, OHIO, ASSIGNOR TO INTERNATIONAL LATEX CORPORATION, OF ROCHESTER, NEW YORK, A CORPORATION OF NEW YORK

DRIVING BELT AND METHOD FOR MAKING SAME

Application filed January 26, 1932. Serial No. 588,908.

This invention relates to driving belts and procedure for making the same.

Driving belts for vacuum cleaners, sewing machines, etc. have heretofore been made of endless, solid rubber construction. These belts deteriorate quickly. It has been discovered that this is due to the heat set up within the rubber of the belt by reason of the stresses set up therein as the belt flexes in passing about the pulleys.

The general purpose of the present invention is to provide a hollow or tubular rubber belt which, it has been found, resists deterioration by reason of the fact that space is provided within the center of the belt into which the rubber of the wall of the belt may be distorted when passing about the pulley so as to relieve the stresses in the belt and greatly to reduce the development of heat.

A further object of the invention is to provide such a belt with a lubricant in the bore thereof further to reduce internal friction and the development of heat.

Further objects of the invention are to provide effective methods for making such belts.

The foregoing and other purposes of the invention are attained in the driving belts and by the methods illustrated in the accompanying drawings and described below. It is to be understood that the invention is not limited to the forms thereof illustrated and described.

Of the accompanying drawings,

Figure 1 is a sectional elevation on line 1—1 of Figure 4, partly broken away, through a mold, the mold parts being separated, showing core material positioned to be molded therein into core strips for use in making the improved belts;

Figure 2 is a similar view with the mold closed;

Figure 3 is a section on line 3—3 of Figure 2;

Figure 4 is a sectional plan, partly broken away, on line 4—4 of Figure 1;

Figure 5 is a sectional elevation, partly broken away, illustrating the step of dipping the core strips in a tank containing an adhesive cement such as rubber cement;

Figure 6 is an enlarged view, partly broken away and in section, of a core strip coated with said cement;

Figure 7 is a view showing said core strip formed into an endless ring with its ends butted;

Figure 8 is an elevation of a drum showing the core strip being rolled into a band of rubber to form an endless rubber belt;

Figure 9 is a sectional view through a belt mold and illustrates the belt as when being molded and vulcanized therein;

Figure 10 is an elevation, partly in section, of the finished belt;

Figure 11:
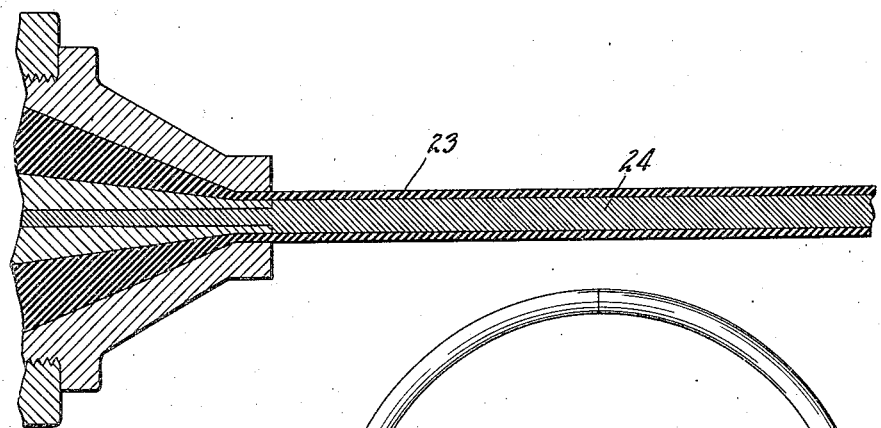
Figure 11 is a sectional view illustrating a method for forming a modified form of core strip.

In providing a hollow driving belt of rubber, it is desirable to obtain sufficient pressure within the bore of a rubber tube to cause the tube to expand against the walls of the mold. It is also desirable to have a lubricant comprising some suitable liquid in the bore of the finished belt to reduce development of heat by friction. It has been found that by use of a core of a material of such consistency as to be built into the belt but which will liquefy and remain liquid to provide a lubricant in the belt and which will expand under heat to force the rubber wall of the belt against the surfaces of a vulcanizing mold, both of these ends may be effectively attained.

In practicing the invention according to one mode, a batch of plastic material 10 comprising a mixture of glue or gelatin and glycerine with water and with suitable powdered fillers, if desired, such as soapstone, graphite, etc., is formed into core strips 11, 11 with supporting or reinforcing threads 12, 12 incorporated therein as by use of a mold comprising cooperating parts 13 and 14 having mating strip forming cavities 15$^a$ and 15$^b$ with means such as pins 16, 16 for supporting threads 12 in said cavities. The plastic gelatin, glycerine and water composition is sufficiently stiff to permit handling without serious deformation.

The core strips 11 thus formed are preferably coated with an adhesive such as rubber cement as by dipping the same into a tank 17 containing this material and are then formed into endless rings (see Figure 7) as by butting the ends thereof together. These ends may be prepared for butting by first cutting off surplus material and reinforcing thread and applying some of the adhesive cement.

A band of vulcanizable rubber 18 to form the driving belt is applied to a conical drum 19 (see Figure 8). This band preferably comprises calendered rubber, the fibre in which extends circumferentially of the band. The core ring as illustrated in Figure 7 is placed about the drum onto that margin of the band which is located at the larger end of the drum and the band is rolled about the core, the conical formation of the drum compensating for the increasing thickness of the belt as the band is rolled about the core toward the smaller end of the drum.

The unvulcanized rubber belt having the plastic core as thus formed is next placed in a vulcanizing mold 20 (Figure 9) and vulcanized under heat and pressure of the core material. The core material has the property of being liquefied when heated in the absence of air and of remaining liquid thereafter at normal atmospheric temperatures. The resulting belt 21 (Figure 10) comprises vulcanized rubber having a bore therein filled with a permanently liquid lubricant 22.

Figure 12:
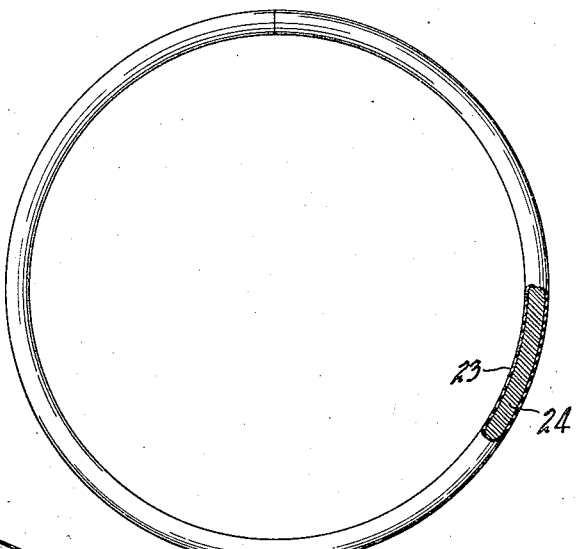
Figure 12 is an elevation, partly in section, illustrating said core strip formed to an endless ring with the ends abutted.
Figure 13:
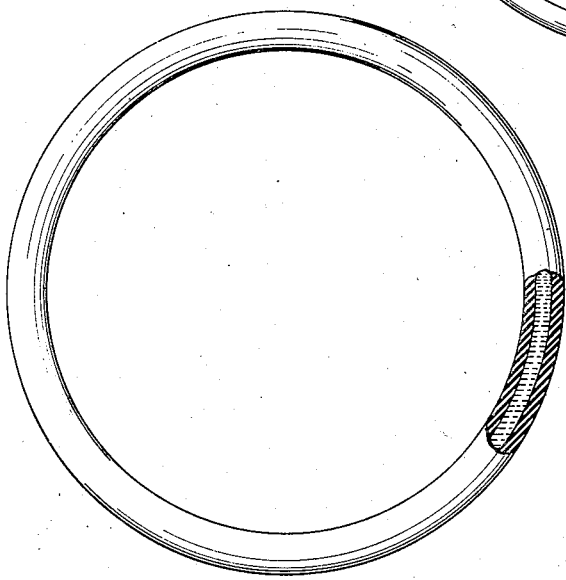
Figure 13 is a view similar to Figure 10 of a belt made by using the core of Figure 12 and rolling into a rubber band in the manner of the core shown in Figure 8.

As illustrated in Figures 11, 12 and 13, a belt embodying the invention may be made by expressing a tube of rubber 23 with a filling 24 of the glue, glycerine and water mixture to provide core strips, butting the ends of said strips to form cores and rolling said cores into a rubber covering in the manner illustrated in Figure 8 and vulcanizing as indicated in Figure 9, the resulting belt being shown in Figure 13.

This application is a continuation-in-part of my prior application Serial No. 334,665, filed January 24, 1929.

Other modes of providing a hollow rubber belt may be resorted to without departing from the spirit of the invention or the scope of the appended claims.

What is claimed is:—

1. An endless tubular driving belt of vulcanized rubber, the bore of which contains only a fluid permitting free flexing and free inward distortion of the rubber of the belt throughout its length.

2. An endless tubular driving belt of vulcanized rubber containing a permanently liquid lubricant.

3. An endless tubular driving belt of vulcanized rubber containing a permanently liquefied mixture of glue, glycerine and water.

4. That method for making tubular driving belts of vulcanized rubber which comprises forming an endless tube of vulcanizable rubber with a plastic material in the bore thereof adapted to expand under heat and vulcanizing said belt under heat, said material being adapted to become permanently fluid upon such vulcanization.

5. That method for making tubular driving belts of vulcanized rubber with comprises forming an endless tube of unvulcanized rubber having incorporated in the bore thereof a material adapted to expand under heat, and vulcanizing said belt under heat.

6. That method for making a driving belt of vulcanized rubber which comprises forming an endless core of a plastic material capable of being rendered permanently fluid when heated to the temperature at which the rubber is vulcanized in the absence of air, applying a vulcanizable rubber covering to said core to form an endless tubular belt, and vulcanizing said belt whereby said belt will have a permanently fluid core.

7. That method for making a driving belt of vulcanized rubber which comprises forming an endless core of plastic material capable of being rendered permanently liquid when heated in the absence of air, forming an endless band of vulcanizable rubber, rolling said band of rubber about said core to make an endless driving belt, and vulcanizing said belt under heat whereby said belt when vulcanized will have a permanently liquid material in the bore thereof.

8. That method for making an endless rubber driving belt which comprises forming an endless rubber tube with a material in the bore thereof adapted to expand under heat, and vulcanizing said belt while enclosed in a mold, said material expanding the belt in the mold, said material being adapted to remain permanently fluid subsequently to such vulcanization.

9. That method for making an endless driving belt of rubber with comprises forming an endless tubular belt of unvulcanized rubber with a core comprising a plastic mixture of glue, glycerine and water therein, and vulcanizing said belt under heat whereby said core will become permanently fluid.

JNO. R. GAMMETER.